United States Patent
Leng

(10) Patent No.: US 12,384,285 B2
(45) Date of Patent: Aug. 12, 2025

(54) VEHICLE SEAT HAVING A FOOTREST

(71) Applicant: Bayerische Motoren Werke Aktiengesellschaft, Munich (DE)

(72) Inventor: Michael Leng, Geltendorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 92 days.

(21) Appl. No.: 18/284,122

(22) PCT Filed: Jun. 10, 2022

(86) PCT No.: PCT/EP2022/065781
§ 371 (c)(1),
(2) Date: Sep. 26, 2023

(87) PCT Pub. No.: WO2022/268523
PCT Pub. Date: Dec. 29, 2022

(65) Prior Publication Data
US 2024/0157865 A1     May 16, 2024

(30) Foreign Application Priority Data
Jun. 24, 2021  (DE) .................... 10 2021 116 347.1

(51) Int. Cl.
*B60N 3/06* (2006.01)
*B60N 2/90* (2018.01)

(52) U.S. Cl.
CPC ............ *B60N 3/063* (2013.01); *B60N 2/929* (2018.02)

(58) Field of Classification Search
CPC ................................. B60N 3/063; B60N 2/929
See application file for complete search history.

(56) References Cited

U.S. PATENT DOCUMENTS

| | | | |
|---|---|---|---|
| 3,794,381 A * | 2/1974 | Caldemeyer | A47C 7/5068 297/423.22 |
| 5,507,562 A * | 4/1996 | Wieland | B60N 3/063 297/423.26 |
| 8,690,239 B2 | 4/2014 | Ishiawa et al. | |
| 2011/0066090 A1 | 3/2011 | Numata et al. | |
| 2012/0091779 A1* | 4/2012 | Chang | B60N 2/995 297/423.3 |

(Continued)

FOREIGN PATENT DOCUMENTS

| | | |
|---|---|---|
| CN | 200948757 Y | 9/2007 |
| DE | 87 08 102 U | 8/1987 |

(Continued)

OTHER PUBLICATIONS

International Search Report (PCT/ISA/210) issued in PCT Application No. PCT/EP2022/065781 dated Sep. 26, 2022, with English translation (4 pages).

(Continued)

*Primary Examiner* — Milton Nelson, Jr.
(74) *Attorney, Agent, or Firm* — Crowell & Moring LLP

(57) ABSTRACT

A vehicle seat has a footrest, a seat lower part having a seat surface, which seat lower part can be or is coupled to a vehicle structure preferably in a longitudinally displaceable manner, and a seat backrest having a backrest surface. The footrest, provided with a support surface, is movable between a stowing position and a use position and is arranged, in the use position, in front of the seat lower part.

9 Claims, 3 Drawing Sheets

(56) References Cited

U.S. PATENT DOCUMENTS

2017/0050539 A1    2/2017   Akimoto
2018/0339632 A1   11/2018   Akaike et al.

FOREIGN PATENT DOCUMENTS

| DE | 10 2004 050 730 A1 | 4/2006 | |
|----|---|---|---|
| DE | 10 2005 013 170 A1 | 10/2006 | |
| DE | 10209186 B4 * | 10/2007 | ........... B60N 2/4495 |
| DE | 10 2010 012 767 A1 | 9/2011 | |
| DE | 10 2010 030 553 A1 | 12/2011 | |
| DE | 10 2018 204 461 A1 | 10/2018 | |
| FR | 2 906 770 A1 | 4/2008 | |
| JP | 58-141964 U | 9/1983 | |
| WO | WO 01/87120 A1 | 11/2001 | |

OTHER PUBLICATIONS

German-language Written Opinion (PCT/ISA/237) issued in PCT Application No. PCT/EP2022/065781 dated Sep. 26, 2022, with English translation (9 pages).
German-language Search Report issued in German Application No. 10 2021 116 347.1 dated May 3, 2022, with partial English translation (13 pages).

* cited by examiner

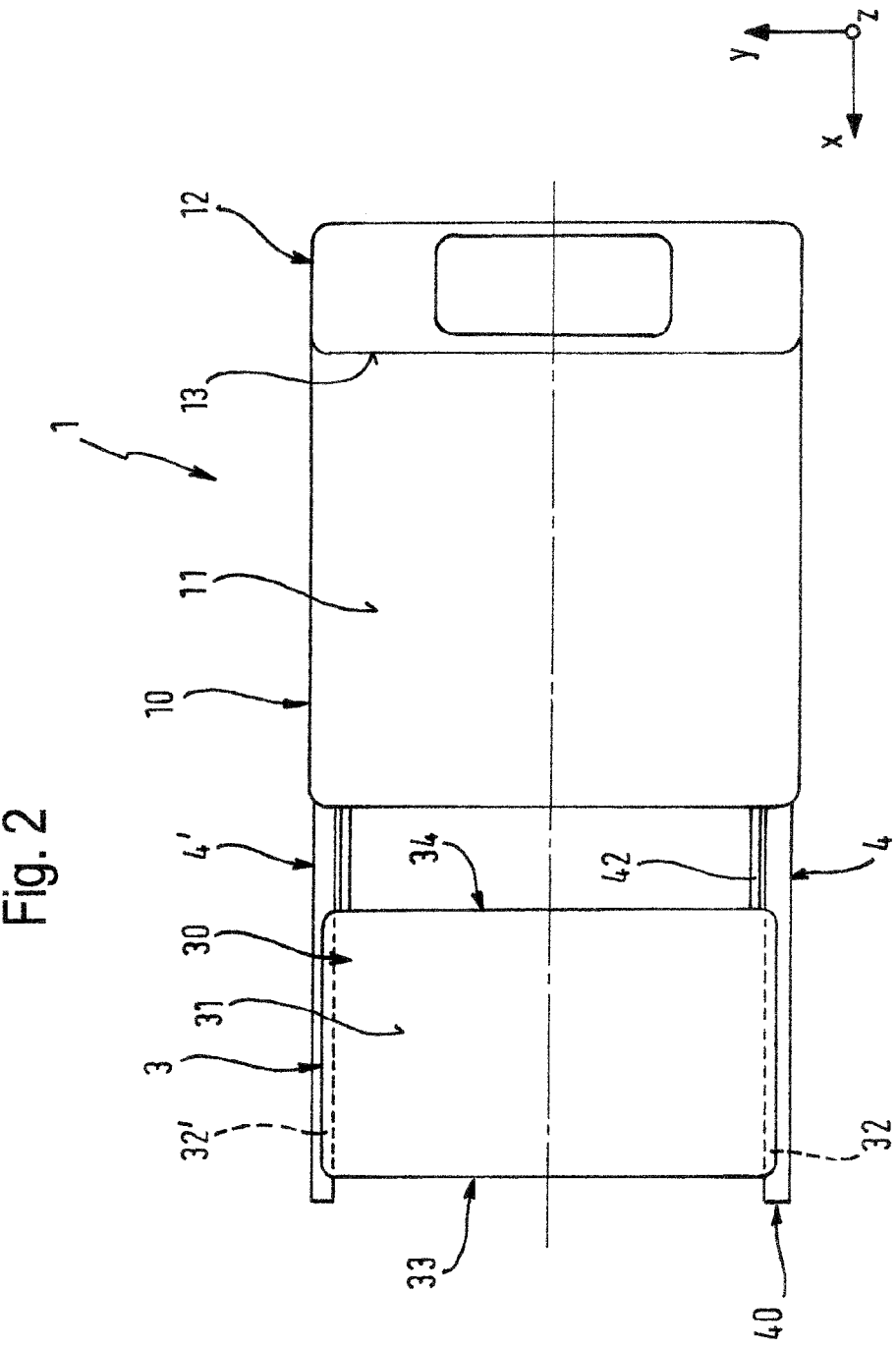

VEHICLE SEAT HAVING A FOOTREST

BACKGROUND AND SUMMARY

The invention relates to a vehicle seat having a footrest. It further relates to a vehicle, in particular a motor vehicle, having at least one such vehicle seat.

The increasing demand for comfort in vehicles, in particular in motor vehicles, gives rise to the wish for comfort-enhancing (reclining) seats having footrests. In particular, in self-driving motor vehicles of the future, the vehicle passengers will be able to use the journey time in the vehicle in order to relax and unwind and will expect such comfort-enhancing seats to be present. When resting the legs, maximum comfort is achieved if the feet can be supported. However, if the support is provided only in the calf region, signs of fatigue can quickly occur. In most cases, the adjustment paths of a support arranged directly on the lower seat part are not sufficient to achieve the position required for resting the feet, or the actuating kinematics have to be of very solid design, which would lead to considerable additional costs and extra weight.

DE 10 2010 012 767 A1 discloses a vehicle seat having a footrest which has a support panel for the feet of a passenger sitting on the vehicle seat, the support panel being arranged in front of the vehicle seat and being movable in relation to the vehicle floor. The support panel is able to be inclined upward, by way of the end remote from the seat, about a transverse axis located at the seat end of the panel. A slide is guided for sliding displacement on the longitudinal sides of the support panel and is connected to the vehicle seat via a flexible supporting element for the passenger's lower legs.

DE 10 2005 013 170 A1 discloses a footrest for a vehicle, the footrest having supporting panels for the lower legs of a passenger sitting on a vehicle seat and being arranged in front of the vehicle seat and being pivotable from a vertical storage position beneath the front edge of the vehicle seat into a horizontal supporting position, in which the support panels can be extended telescopically.

DE 10 2004 050 730 A1 discloses and describes a vehicle seat arrangement, which has vehicle seats arranged one behind the other, in an aircraft, wherein a flexible supporting part, which is arranged beneath a seat in front and can be pulled out in the rearward direction in the manner of a roller-blind arrangement, can be fitted on the base of a seat located behind and, in the fitted state, forms a rest for the feet and lower legs of a passenger sitting on the seat behind.

FR 2 906 770 A1 discloses and describes a vehicle seat having a footrest which is able to be moved telescopically forward from a stowed position under the vehicle seat by means of a rail arrangement arranged under the seat and is able to be tilted about a transverse axis.

The object of the present invention is to provide an improved vehicle seat having a footrest that can be stowed under the vehicle seat to save space when not in use.

This object is achieved with the features of the independent claims.

In a vehicle seat that achieves this object, having a footrest, a lower seat part with a seat surface, which lower seat part is or is able to be coupled to a vehicle structure preferably in a longitudinally displaceable manner, and a backrest with a backrest surface, wherein the footrest, provided with a supporting surface, is movable between a stowed position and a position of use and is arranged, in the position of use, in front of the lower seat part, provision is made according to the invention that the footrest has a first edge, facing away from the lower seat part, a second edge, facing toward the lower seat part, and also at least one longitudinal member extending from the first edge to the second edge, that the at least one longitudinal member is connected, in the region of the first edge, to a first guide element of an actuating mechanism, which guide element is guided longitudinally displaceably in a guide rail of the actuating mechanism arranged in front of the lower seat part and extending away from the lower seat part, that the at least one longitudinal member is connected, in the region of the second edge, to an actuating lever belonging to the actuating mechanism, so as to be pivotable about a first transverse axis, and that the actuating lever is mounted pivotably about a second transverse axis relative to the vehicle structure or relative to the lower seat part and can be actuated pivotably about the second transverse axis by means of an actuator device.

In the retracted state, the footrest according to the invention is arranged under or in front of the front region of the vehicle seat, in particular of the lower seat part. By way of the guide rail, the supporting surface of the footrest can be moved far from the vehicle seat in the longitudinal direction of the vehicle, for example forward, into the position of use.

Further preferred and advantageous design features of the vehicle seat according to the invention are the subject matter of the dependent claims.

It is advantageous if the first guide element, arranged longitudinally displaceably in the guide rail, is movable along the guide rail by means of the actuator device, which can be driven by a drive element. The longitudinal adjustment of the supporting surface can thus take place non-manually by means of the actuator device.

Preferably, the drive element is formed by an electric motor and the actuator device by a spindle gear. This spindle gear preferably has a spindle drive with a spindle driven in rotation by the electric motor.

It is also advantageous if the guide rail, at its end near the seat, is mounted so as to be pivotable about a third transverse axis relative to the vehicle structure or relative to the lower seat part. It is thereby possible to incline the supporting surface.

For this, an embodiment is particularly advantageous in which the pivotably mounted guide rail forms an upper guide rail, where a lower guide rail is arranged in front of the lower seat part below the upper guide rail and extends in a longitudinal direction away from the lower seat part, and where a guide lever is provided which, in the region of its first end, is coupled pivotably relative to the longitudinal member and which, in the region of its second end, is provided with a second guide element, which is guided longitudinally displaceably in the lower guide rail. The lever kinematics formed in this way permit an automatic inclination of the supporting surface when the footrest is extended into its position of use.

It is particularly advantageous if the lower guide rail is shorter than the upper guide rail, with that end of the lower guide rail near the seat being farther away from the lower seat part than that end of the upper guide rail near the seat. This geometry of the guide rails ensures that the guide lever is pivoted about a transverse axis upon extension of the footrest and thereby in turn pivots the upper guide rail and in so doing lifts the front end of the supporting surface facing away from the lower seat part.

If the actuating lever is designed as a telescopic rod, which is adjustable in its longitudinal extent, further adjustment options for the position and the inclination of the supporting surface can be achieved in an advantageous manner in addition to the adjustability with the lever mechanism.

An embodiment which can be combined with other embodiments of the invention, and in which the footrest is provided on each of its two longitudinal sides with a longitudinal member and an actuating mechanism assigned to the latter, is advantageous.

The invention is also directed to a vehicle, in particular to a motor vehicle, having at least one vehicle seat according to the invention.

Preferred exemplary embodiments of the invention with additional design details and further advantages are described and explained in more detail below with reference to the attached drawings.

BRIEF DESCRIPTION OF THE DRAWINGS

FIG. 2 is a plan view of the schematically illustrated vehicle seat from FIG. 1B with the footrest fully extended.

DETAILED DESCRIPTION OF THE DRAWINGS

Figure 1A:
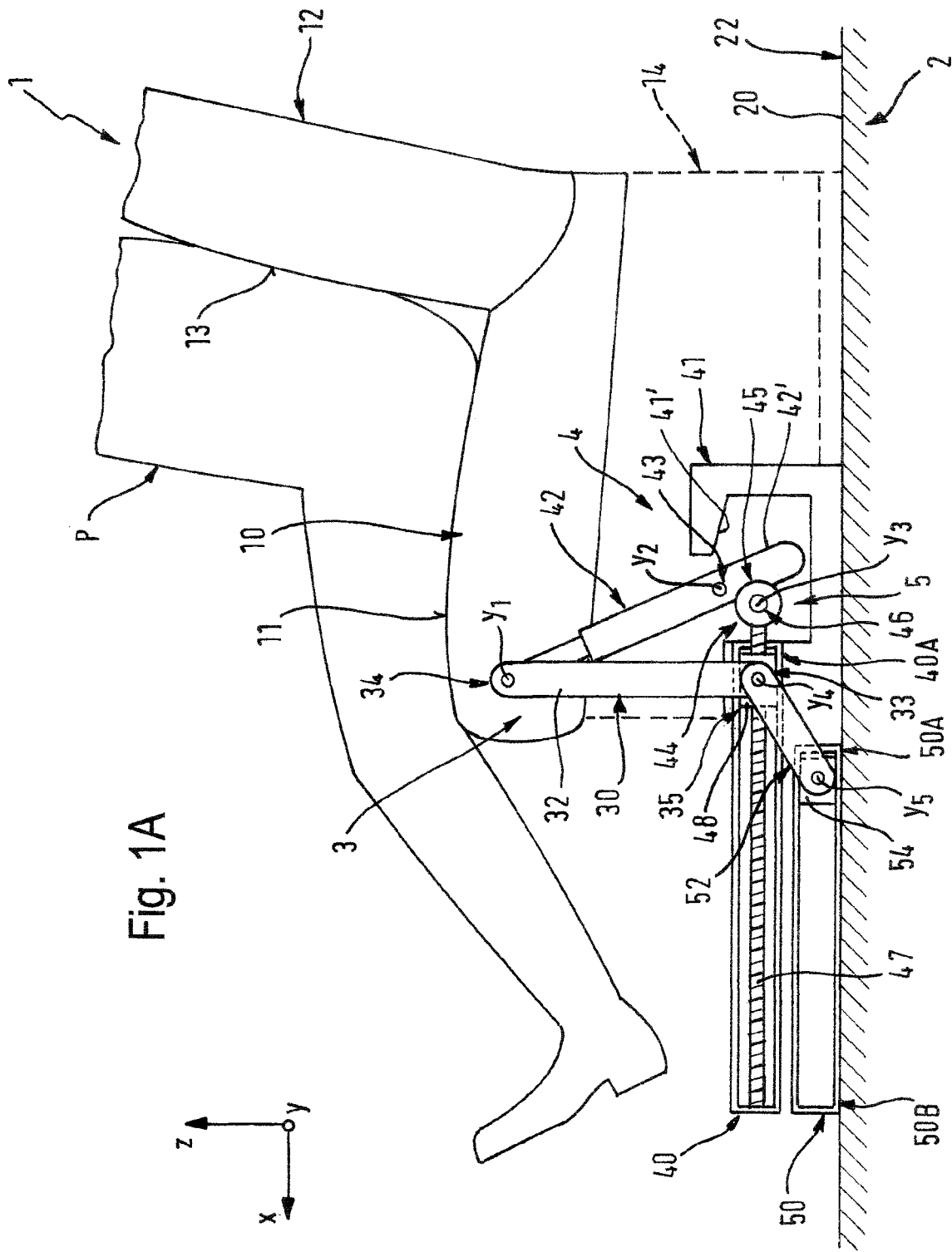
FIG. 1A is a side view of a schematically illustrated vehicle seat with a footrest according to an embodiment of the invention in a stowed position.
Figure 1B:
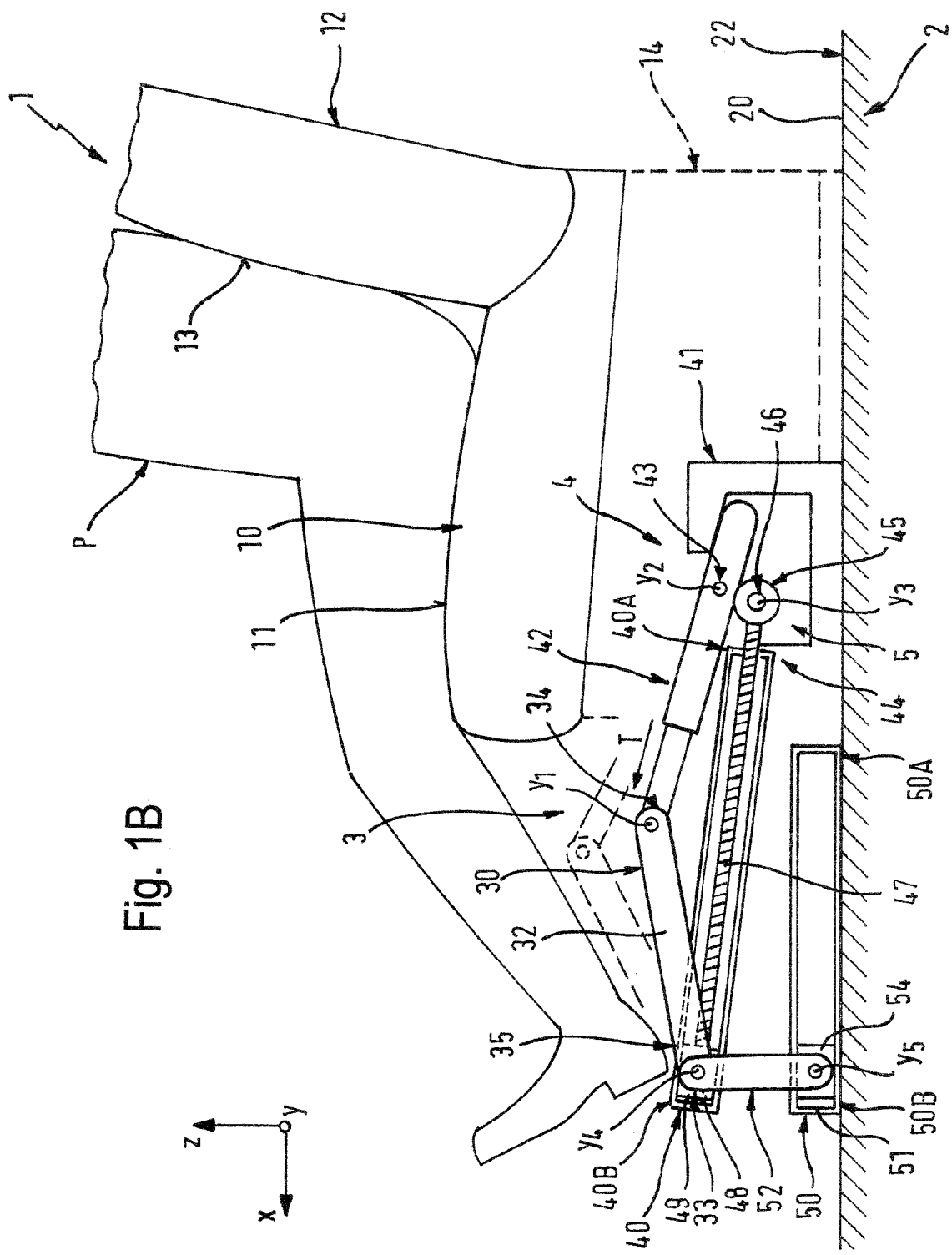
FIG. 1B is the vehicle seat from FIG. 1A with the footrest fully extended in its position of use.

FIG. 1A and FIG. 1B show schematic representations of a vehicle seat 1 from the left side, with a lower seat part 10 having a seat surface 11, and with a backrest 12 which is usually attached thereto in a tiltable manner and which has a backrest surface 13. A passenger P sitting on the vehicle seat 1 is also shown schematically. The vehicle seat is mounted, preferably longitudinally displaceably, on the passenger-compartment floor 20 of the vehicle structure 22 of a vehicle 2 via a seat console 14, the latter being known per se and being indicated only schematically by broken lines in the figure. The vehicle seat 1 can be an individual seat or it can be part of a bench seat.

The vehicle seat 1 is assigned a footrest 3 which, in the manner described below, is arranged on the lower seat part 10, on the seat console 14 or, preferably, on the passenger-compartment floor 20 of the vehicle 2. The footrest 3 has a support panel 30 with an upper supporting surface 31 and two lateral longitudinal members 32, 32', which are connected to the support panel 30 on its two longitudinal sides facing away from each other and which extend from a first edge 33, facing away from the lower seat part 10, to a second edge 34, facing toward the lower seat part 10.

As is described in detail below, the footrest 3 is movable between a stowed position beneath the lower seat part 10 and the position of use illustrated in FIG. 1B, in which the support panel 30 of the footrest 3 is arranged in front of the lower seat part 10.

A left-side actuating mechanism 4 shown in FIG. 1 is described below, by means of which the support panel 30 of the footrest 3 can be extended from the stowed position into the position of use and retracted back into the stowed position. As can be seen in FIG. 2, there is also a right-side actuating mechanism 4', which is constructed in the same way as the left-side actuating mechanism 4, and therefore the relevant statements below also apply analogously to the right-side actuating mechanism 4', for which reason only the left-side actuating mechanism 4 is described here. The two actuating mechanisms 4, 4' work synchronously and are preferably driven by a common drive device 5.

The longitudinal member 32 is connected, in the region of the first edge 33, to a first guide element 35 which is guided in a longitudinally displaceable manner in an upper guide rail 40 of the actuating mechanism 4 which is arranged in front of the lower seat part 10 and which extends away from the lower seat part 10. The longitudinal member 32 is connected, in the region of the second edge 34, to an actuating lever 42 belonging to the actuating mechanism 4, so as to be pivotable about a first transverse axis y1. The actuating lever 42 is mounted pivotably about a second transverse axis y2 relative to the vehicle structure 22 or relative to the lower seat part 10 and, in the manner described below, can be actuated pivotably about the second transverse axis y2 by means of an actuator device 44 that can be driven by a drive element 45. For this purpose, in the example shown, a bearing block 41 connected to the vehicle structure 22 is provided on which a first bearing 43, fixed to the vehicle and defining the second transverse axis y2, is formed for the pivotable mounting of the actuating lever 42. The actuating lever 42 is preferably designed as a telescopic rod which is adjustable in its longitudinal extent. In this way, the distance between the two transverse axes y1 and y2 forming pivot axes can be increased or decreased, as a result of which additional adjustment options for the position and the inclination of the support panel 30 and thus of the supporting surface 31 are created. The drive element 45 for the actuator device 44 is also mounted in or on the bearing block 41. Also provided on the bearing block 41 is a second bearing 46 fixed to the vehicle, which defines a third transverse axis y3 and in which that end 40A of the upper guide rail 40 near the seat is mounted pivotably relative to the vehicle structure 22.

The actuator device 44 has a spindle shaft 47, which runs in or next to the guide rail 40 and parallel thereto and can be driven in rotation by the drive element 45, and a spindle nut 48, which is in threaded engagement with the spindle shaft 47. In the example shown, the spindle nut 48 is connected to the first guide element 35 or formed integrally in the latter. The spindle shaft 47 and the spindle nut 48 therefore form a spindle gear. The first guide element 35, arranged longitudinally displaceably in the guide rail 40 in this way, is driven by the drive element 45 movably along the upper guide rail 40. In this case, the drive element 45 is preferably formed by an electric motor.

A lower guide rail 50 is arranged below the upper guide rail 40, in front of the lower seat part 10, and extends away from the lower seat part 10 in the longitudinal direction X and parallel to the upper guide rail 40. A guide lever 52 is connected, in the region of its first end, to the first guide element 35 so as to be pivotable about a fourth transverse axis y4 and is thus coupled pivotably relative to the longitudinal member 32. In the region of its second end, the guide lever 52 is provided with a second guide element 54 which is guided in the lower guide rail 50 in a longitudinally displaceable manner. The lower guide rail 50 is shorter than the upper guide rail 40. That end 50A of the lower guide rail 50 near the seat is farther away from the lower seat part 10 than that end 40A of the upper guide rail 40 near the seat.

When the first guide element 35 is moved forward out of the stowed position, i.e. away from the lower seat part 10, by means of the spindle shaft 47, it takes the first (front) edge 33 of the support panel 30 with it, with the support panel 30 being pivoted clockwise about the fourth transverse axis y4. At the same time, there is a relative pivoting between the support panel 30 and the actuating lever 42 about the first transverse axis y1, as a result of which the actuating lever 42 is pivoted counterclockwise about the second transverse axis y2, as the guide element 35 is moved forward, until the end portion 42' of the actuating lever 42 facing away from the transverse axis y1 bears on an inner lower abutment surface 41' of the bearing block 41. Since the lower guide rail 50 is shorter than the upper guide rail 40 in the manner described above, the guide lever 52, in the stowed position shown in FIG. 1A, is inclined in a downward direction away from the lower seat part 10. This inclination has the effect that the second guide element 54 guided in the lower guide rail reaches the end stop 51 at the front end 50B of the lower guide rail 50 remote from the seat before the first guide element 35 reaches the end stop 49 at the front end 40B of the upper guide rail 40 remote from the seat. If the first guide element 35 is moved farther away from the lower seat part 10 by means of the spindle shaft 47, the guide lever 52 pivots counterclockwise about a fifth transverse axis y5 formed by the second guide element 54 and in the process lifts the front end 40B of the upper guide rail 40. The upper guide rail pivots clockwise about the third transverse axis y3 and at the same time raises the front edge 33 of the support panel 30 facing away from the seat. If, in this position of use, the telescopic actuating lever 42 is extended, i.e. the distance between the transverse axes y1 and y2 is lengthened, as is symbolically represented in FIG. 1B by the arrow T and the dashed line, the support panel 30 pivots counterclockwise about the transverse axis y4 and the angle of inclination of the support panel 30 and thus also of the upper supporting surface 31 of the footrest 3 changes. When the footrest 3 is moved back from the position of use (FIG. 1B) to the stowed position (FIG. 1A), the movements described above take place in the opposite direction.

The invention is not limited to the above exemplary embodiment, which merely serves to generally explain the core concept of the invention. Rather, within the scope of protection, the device according to the invention can also assume configurations other than those that have been described above. In this case, the device can in particular have features which represent a combination of the respective individual features of the claims.

Reference signs in the claims, the description and the drawings serve only to provide a better understanding of the invention and are not intended to limit the scope of protection.

LIST OF REFERENCE SIGNS 1 vehicle seat
2 vehicle
3 footrest
4 left-side actuating mechanism
4' right-side actuating mechanism
5 drive device
10 lower seat part
11 seat surface
12 backrest
13 backrest surface
14 seat console
20 passenger-compartment floor
22 vehicle structure
30 support panel
31 upper supporting surface
32 longitudinal member
32' longitudinal member
33 far edge
34 near edge
35 first guide element
40 upper guide rail
40A end of 40 near seat
40B end of 40 remote from seat
41 bearing block
41' inner lower abutment face of 41
42 actuating lever
42' lower end portion of 42
43 first bearing
44 actuator device
45 drive element
46 second bearing fixed to vehicle
47 spindle shaft
48 spindle nut
49 front end stop of 40 remote from seat
50 lower guide rail
50A end of 50 near seat
50B end of 50 remote from seat
51 front end stop of 50 remote from seat
52 guide lever
54 second guide element
P passenger
y1 first transverse axis
y2 second transverse axis
y3 third transverse axis
y4 fourth transverse axis
y5 fifth transverse axis

The invention claimed is:

1. A vehicle seat, comprising:
a footrest;
a lower seat part with a seat surface, which lower seat part is or is able to be coupled to a vehicle structure; and
a backrest with a backrest surface, wherein
the footrest, provided with a supporting surface, is movable between a stowed position and a position of use and is arranged, in the position of use, in front of the lower seat part,
the footrest has a first edge facing away from the lower seat part, a second edge facing toward the lower seat part, and at least one longitudinal member extending from the first edge to the second edge,
the at least one longitudinal member is connected, in the region of the first edge, to a first guide element of an actuating mechanism, which first guide element is guided longitudinally displaceably in a guide rail of the actuating mechanism arranged in front of the lower seat part and extending away from the lower seat part,
the at least one longitudinal member is connected, in the region of the second edge, to an actuating lever belonging to the actuating mechanism, so as to be pivotable about a first transverse axis, and
the actuating lever is mounted pivotably about a second transverse axis relative to the vehicle structure or relative to the lower seat part and is actuatable pivotably about the second transverse axis via an actuator.

2. The vehicle seat according to claim 1, wherein
the first guide element, arranged longitudinally displaceably in the guide rail, is movable along the guide rail via the actuator, which is driven by a drive element.

3. The vehicle seat according to claim 2, wherein
the drive element is formed by an electric motor and the actuator by a spindle gear.

4. The vehicle seat according to claim 1, wherein
the guide rail, at its end near the lower seat part, is mounted so as to be pivotable about a third transverse axis relative to the vehicle structure or relative to the lower seat part.

5. The vehicle seat according to claim 4, wherein
the pivotably mounted guide rail forms an upper guide rail,
a lower guide rail is arranged in front of the lower seat part below the upper guide rail and extends in a longitudinal direction away from the lower seat part, and
a guide lever is provided which, in the region of its first end, is coupled pivotably relative to the longitudinal member and which, in the region of its second end, is provided with a second guide element, which is guided longitudinally displaceably in the lower guide rail.

6. The vehicle seat according to claim 5, wherein
the lower guide rail is shorter than the upper guide rail, with that end of the lower guide rail near the lower seat part being farther away from the lower seat part than that end of the upper guide rail near the lower seat part.

7. The vehicle seat according to claim 1, wherein
the actuating lever is a telescopic rod which is adjustable in a longitudinal extent.

8. The vehicle seat according to claim 1, wherein
the footrest is provided, on each of its two longitudinal sides, with a respective longitudinal member and with a respectively assigned actuating mechanism.

9. A vehicle comprising at least one vehicle seat according to claim 1.

* * * * *